United States Patent [19]

Eakin

[11] Patent Number: 5,004,966

[45] Date of Patent: Apr. 2, 1991

[54] COMPUTER ACTIVATED REWARD DISPENSING MACHINE

[76] Inventor: Gary N. Eakin, Box 9039, Spirit Lake, Iowa 51360

[21] Appl. No.: 442,569

[22] Filed: Nov. 29, 1989

[51] Int. Cl.⁵ .......................................... B65D 83/04
[52] U.S. Cl. ................................. 318/446; 318/98; 221/13; 221/15; 221/82; 221/83; 364/479
[58] Field of Search ........................ 222/52, 59, 60, 63, 222/129, 138, 139, 142.2, 142.9, 144, 167, 168.5, 170, 172, 626, 627, 333, 504, 367, 368; 364/479; 318/98, 446; 221/9, 5, 15, 2, 82, 69, 72, 75, 81, 82, 83, 85, 86, 88, 89, 91

[56] References Cited

U.S. PATENT DOCUMENTS

| | | | |
|---|---|---|---|
| 3,031,055 | 4/1962 | Soule | 221/86 X |
| 3,166,214 | 1/1965 | Stevens et al. | 221/81 X |
| 3,712,507 | 1/1973 | Holt | 221/82 |
| 3,727,794 | 4/1973 | DiEranco | 221/86 X |
| 4,159,783 | 7/1979 | Crasnianski | 221/13 |
| 4,519,522 | 5/1985 | McElwee | 221/13 |
| 4,572,403 | 2/1986 | Benaroya | 364/479 X |
| 4,604,557 | 8/1986 | Cowles | 222/63 X |
| 4,674,651 | 6/1987 | Scidmore et al. | 221/9 X |
| 4,747,514 | 5/1988 | Stone | 221/15 X |
| 4,748,600 | 5/1988 | Urquhart | 221/15 X |
| 4,811,764 | 3/1989 | McLaughlin | 221/82 X |
| 4,838,453 | 6/1989 | Luckstead | 221/86 X |
| 4,893,727 | 1/1990 | Near | 221/83 X |
| 4,911,327 | 3/1990 | Shepherd et al. | 221/82 X |

Primary Examiner—Paul Ip

[57] ABSTRACT

A machine is designed to be used as an educational tool. The machine is connected to a 120 volt alternating current source of electrical power and to a personal computer. The computer is programmed to put questions on a monitor and to send a signal to the machine, after a certain number of correct responses to the questions have been entered into said computer. The signal causes the source of electrical power to move one of a plurality of compartments, 75, to an opening, 58, in the machine so that a person may retrieve the object the compartment was holding, as a reward for having answered the questions correctly.

4 Claims, 3 Drawing Sheets

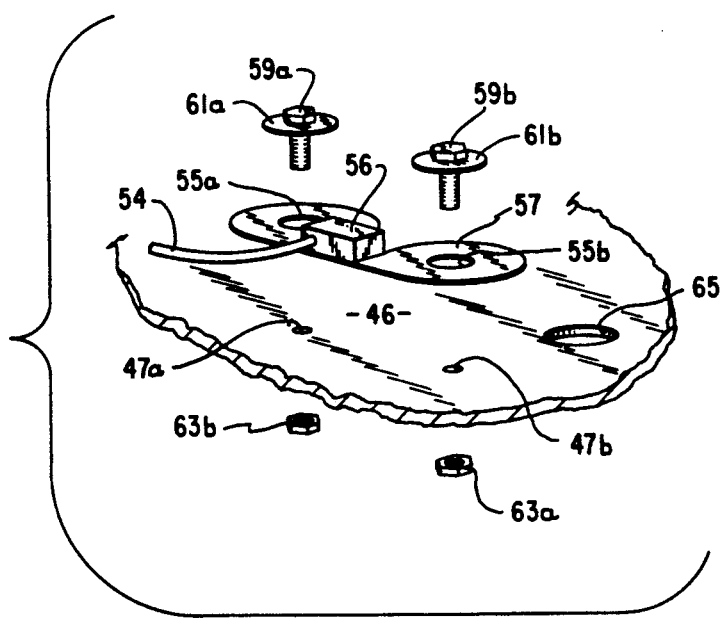
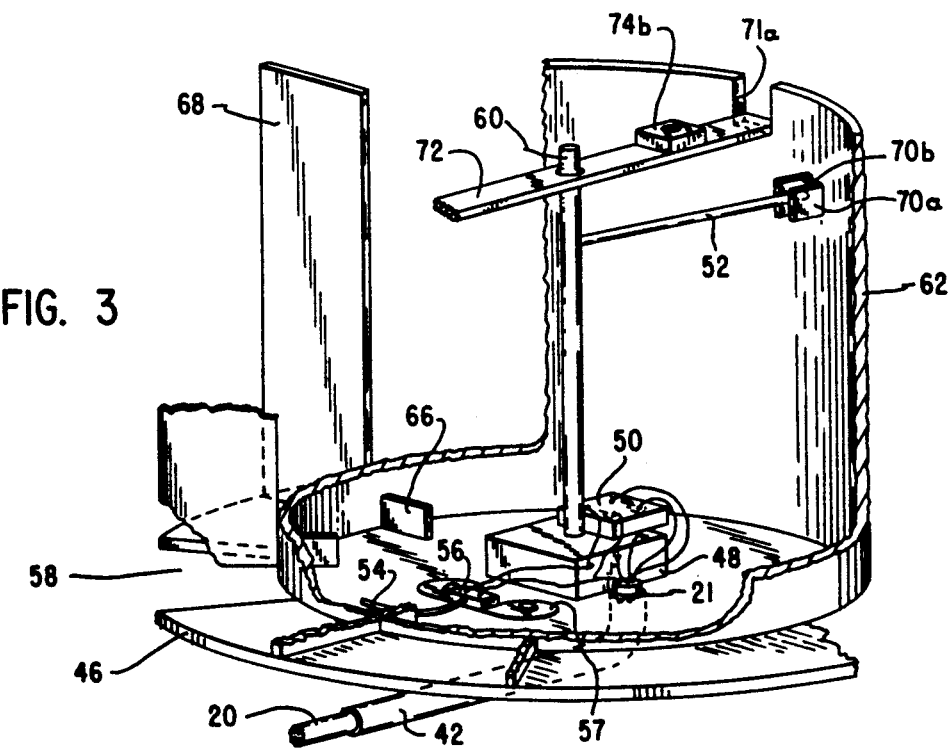

COMPUTER ACTIVATED REWARD DISPENSING MACHINE

BACKGROUND

1. Field of Invention

This invention relates to machines that reward a student for correct answers, and specifically to a machine that dispenses a tangible reward, when activated by an electrical signal from a computer.

2. Discussion of Prior Art

Most machines used in education to motivate student learning, by rewarding the student for correct answers, are machines that provide only intangible rewards. And I am not aware of any machine, heretofore, that not only dispenses a tangible reward, but also allows a student the added fun of being able to interact with a computer, while in pursuit of the reward.

OBJECTS AND ADVANTAGES

The features of my machine that are listed numerically below make it exceptionally well adapted for use in schools or homes as a motivational tool for educating students:

1. The machine is capable of dispensing a very large variety of tangible rewards such as coins, candy bars, etc, etc. The anticipation of wondering what kind of reward the machine might drop out makes its use very exciting for students.
2. The machine plugs into one of the outlet ports on a computer. The computer is then programmed to give the student questions via the computer's monitor. The computer is also programmed to accept anwswers to these questions from keyboard entries by the student. When the student has answered enough questions correctly, as specified by the computer program, the computer is programmed to send a signal to the machine. This signal then causes the machine to dispense a reward to the student. Therefore, not only does the student have the excitement of anticipating some tangible reward for correct answers, but my machine also allows the student to interact with a computer in the process, and students enjoy interacting with computers.
3. The machine has a drawer to store rewards in, and this makes its use more convenient for a teacher or parent, since there is always a ready access to rewards should the machine need refilling, before its use is assigned to a student.
4. The machine has a means for notifying a teacher or parent as to how many of its compartments still hold a reward. Therefore, the teacher can decide whether or not to refill the machine, before its use is assigned to the students.
5. The machine is designed to make it difficult for a student to get at any of the rewards stored in the machine, except by earning them with correct answers. A handguard and one small padalock make theft from the machine difficult.
6. My machine is designed to be constructed primarily out of plastic and with its electrical parts enclosed by plastic, thereby making it safer for the student against the hazard of electrical shock.
7. The machine is small enough to sit on a desktop alongside a microcomputer, and its flat top allows books, etc. to be placed on it and thus conserve desktop space.

BRIEF DESCRIPTION OF THE DRAWINGS

FIG. 2 is a top view of the middle floor, which has a section cut out of it. It shows the manner in which the electrical switch is secured to the middle floor in order to make its position adjustable.

FIG. 3 is a topview of a cutaway section of the hollow inner drum and its accompanying slats. It shows the hollow inner drum and slats sitting on the middle floor. It shows the electric motor and electrical switch inside of the hollow inner drum and secured to the middle floor. FIG. 3 helps one to see how the electric motor rotates the magazine to cause rewards to drop through the middle floor opening in the middle floor. It also helps one to see how the slat tabs, that extend into the interior of the hollow inner drum, are used to operate the electrical switch that turns the electric motor off at just the right time, namely after a compartment has become aligned over the middle floor opening and the reward that the compartment was holding has dropped down through the middle floor opening.

REFERENCE NUMERALS IN DRAWINGS

Figure 1:
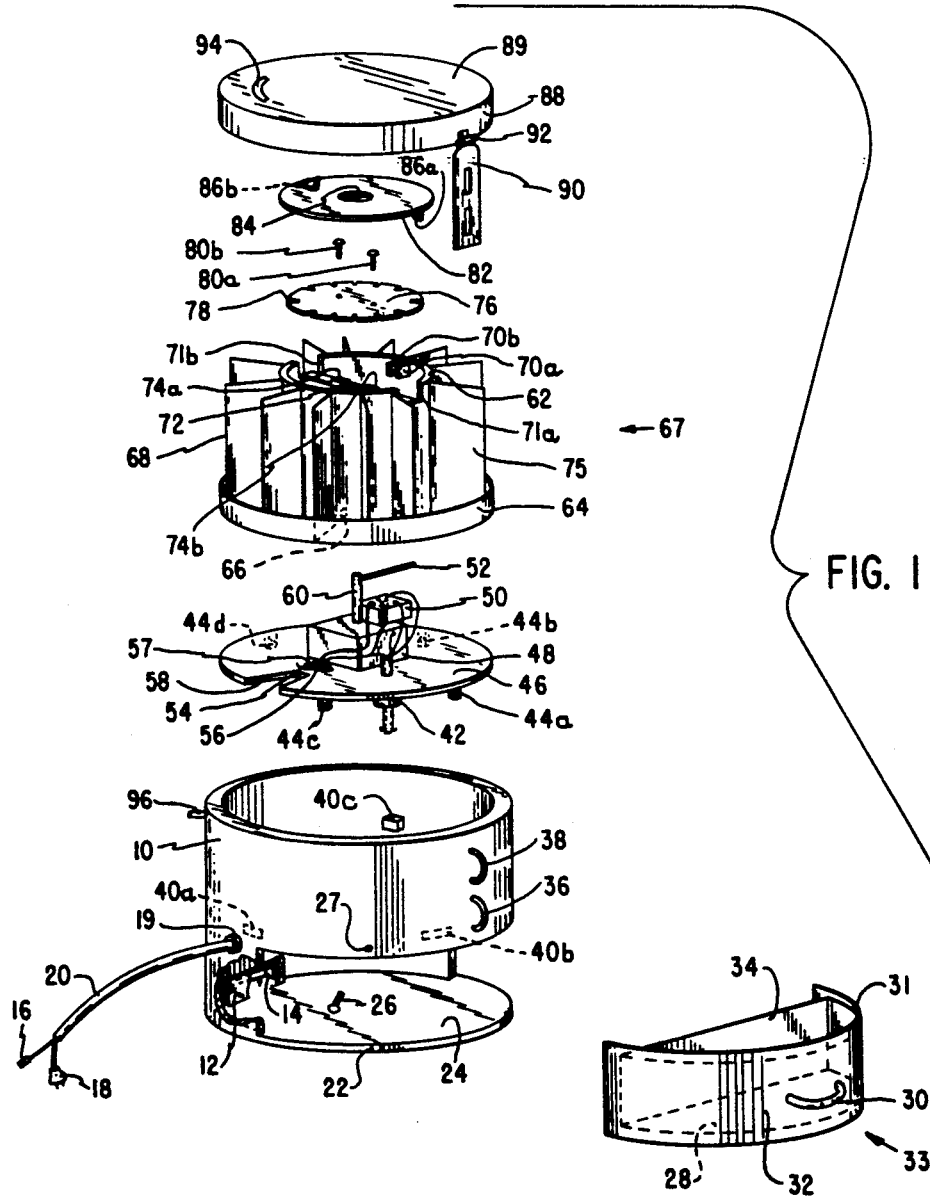
FIG. 1 is an exploded view of my invention. It shows the drawer pulled out of and to one side of the case. It shows the lid lifted up from the top of the case and the internal parts lifted up out of the case.

10; case
12; hand shield
14; hand entry
16; computer cord
18; electric power cord
19; hole in case for electrical lead
20; electrical lead
21; clamp
22; bottom floor
24; drawer entry
26; tie down bolt
27; hole in case for tie down bolt
28; drawer floor
30; drawer handle
31; drawer molding
32; drawer front
33; drawer
34; back of drawer
36; latch stay
38; latch support
40a; middle floor support
40b; middle floor support
40c; middle floor support
42; electric conduit
44a; middle floor tie down
44b; middle floor tie down
44c; middle floor tie down
44d; middle floor tie down
46; middle floor
47a; middle floor switch pad hole
47b; middle floor switch pad hole
48; electric motor
50; electrical valve
52; drive arm
54; switch arm 55a: switch pad hole
55b: switch pad hole
56: electrical switch
57: switch pad
58: middle floor opening
59a: switch pad bolt
59b: switch pad bolt
60: drive shaft
61a: switch pad washer
61b: switch pad washer
62: hollow inner drum
63a: nut
63b: nut
64: slat band
65: electrical lead hole in middle floor
66: slat tab
67: magazine
68: slat
70a: drive tab
70b: drive tab
71a: inner drum notch
71b: inner drum notch
72: pivot bar
74a: spacer
74b: spacer
75: compartment
76: slot wheel
78: slot
80a: slot wheel peg
80b: slot wheel peg
82: number wheel
84: grab bar
86a: number wheel tab
86b: number wheel tab
88: lid band
89: lid
90: latch
92: hinge rod
94: window
95: lid band's front notch
96: lid pin
98: padalock

DESCRIPTION OF INVENTION

FIG. 1 shows the case, 10. The case is a 12¼ inch length of P.V.C. pipe, having a wall thickness of 3/16 inch and an inner diameter of about 13¼ inches, with two sections c out of the bottom half to create the drawer entry, 24, and the hand entry, 14. The drawer entry, 24, is an opening created by cutting a 5¼ inch high semicircle section of wall out of backside and bottom part of the case. The hand entry, 14, is an opening created by cutting a 2¼ inch high and 6 inch long section of wall out of the front and bottom part of the case opposite the drawer entry, 24.

The hand shield, 12, FIG. 1, is a an approximately 6 by 6 by ¼ inch thick sheet of plastic. One end of the hand shield is welded to the inside of the case about 2¼ inches above the hand entry, 14. The hand shield extends out and down from its point of attachment to the case so that the end opposite the point of attachment ends up about 2¼ inches above the bottom of the case.

There are three middle floor supports, 40a, 40b, and 40c, FIG. 1. Each middle floor support is a 1 by 1 by 3/16 inch thick piece of plastic shaped to fit the curve of the inside of the case. Each middle floor support is spaced an equal distance apart around the inside of the case and welded to the inside of the case with the top of each middle floor support being 6⅛ inches up from the bottom rim of the case.

Figure 5:
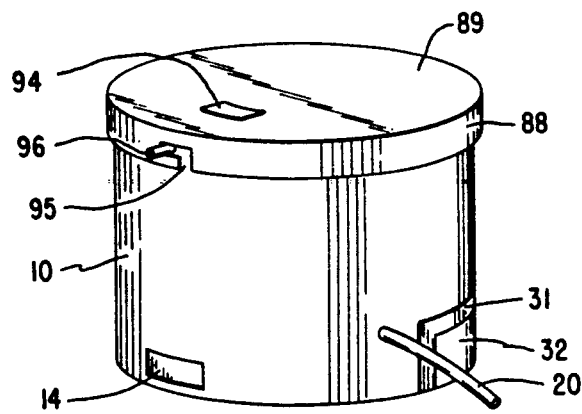
FIG. 5 shows the machine as it would appear sitting on a table top, looking down on it from its front side.

The lid pin, 96, FIG. 1 and FIG. 5, is a ½ inch length of ¼ inch diameter plastic rod. The lid pin is welded to the outside wall of the case at a distance about ⅛ inch down from the top rim of the case and so that the lid pin extends out perpendicular from the wall of the case.

Figure 6:
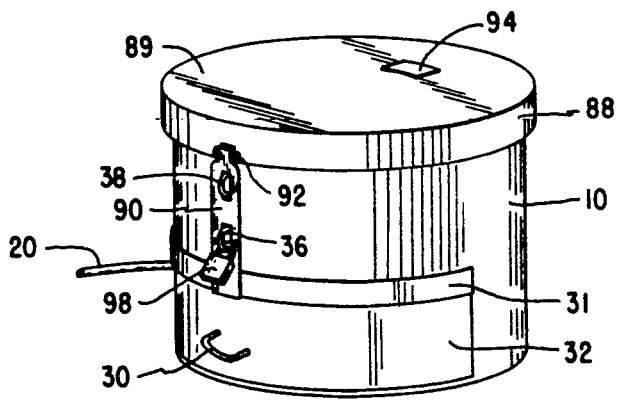
FIG. 6 shows the machine as it would appear sitting on a table top, looking at it from its back side.

The latch support, 38, and latch stay, 36, FIG. 1 and FIG. 6, are each a 3/16 inch thick half moon shaped piece of plastic, having a length of about 1 inch and a maximum width of about ⅜ inch. The latch stay, 36, has a ¼ inch hole near its curved edge. The latch support and latch stay are each welded 1 inch apart from each other on the outside wall of the case and such that they are both on a vertical line that is 180 degrees around from the lid pin and on the backside of the case.

The bottom floor, 22, FIG. 1, is a 3/16 inch thick circular piece of plastic having a diameter of 13¼ inches. With the case, 10, sitting on a flat surface, the bottom floor is placed on this surface inside of the case and welded to the inside wall and flush with the bottom rim of the case.

The middle floor, 46, FIG. 1, is a 3/16 inch thick circular piece of plastic having a diameter of 13¼ inches, and having a pie shaped notch cut out of a section of its circumference to form the middle floor opening, 58, FIG. 1 and FIG. 3. The middle floor opening is 3½ inches wide at the middle floor's circumference and goes inward, about 3¼ inches toward the center of the middle floor, tapering down to a width of 2 inches.

On the top side of the middle floor, 46, is mounted a electric motor, 48, FIG. 1 and FIG. 3. The electric motor is an alternating current 115 volt, 0.3 ampere, one revolution per minute, gear reduction type. The electric motor is mounted on the top side of the middle floor so that the steel drive shaft, 60, FIG. 1 and FIG. 3, of the electric motor is pointing vertically up from the center point of the middle floor. The drive arm, 52, FIG. 1 and FIG. 3, is a steel rod of the same diameter as the drive shaft, 60, and is welded unto the drive shaft and at a right angle to the drive shaft. The drive arm is approximately 3½ inches in length. A electrical valve, 50, FIG. 1 and FIG. 3, is mounted on top of the electric motor, 48, and underneath the drive arm, 52. The electrical valve is an electronic solid state relay.

The switch pad, 57, FIG. 2 and FIG. 3, is a ¼ inch thick piece of plastic shaped roughly in the shape of a figure eight with a ⅛ inch diameter hole in each end of the figure eight to make the two switch pad holes, 55a and 55b, FIG. 2. The middle section of the switch pad is wide enough for the electrical switch, 56, FIG. 1 and FIG. 3, to rest upon, and the electrical switch is glued to this middle portion of the switch pad. The electrical switch is a single pole double throw snap action micro switch. The switch arm, 54, FIG. 1 and FIG. 3, is part of the electrical switch and is a strip of metal that extends out about 2½ inches from where it is attached to the electrical switch. The switch pad washers, 61a and 61b, FIG. 2, are ⅜ inch diameter ⅛ inch thick circular pieces of plastic with a ⅛ inch diameter hole at their centers. The switch pad bolts, 59a and 59b, FIG. 2, are ⅛ inch diameter ⅜ inch long plastic bolts. Two ⅛ inch diameter holes are drilled through the middle floor and then the switch pad with its attached electrical switch is placed on the top side of the middle floor so that each of the switch pad holes, 55a and 55b, FIG. 2, have their centers over these two ⅛ inch diameter holes that have been drilled through the middle floor. Then the switch pad washers, 61a and 61b, FIG. 2, are placed on the switch pad bolts, 59a and 59b, as shown in FIG. 2, and the switch pad bolts are ran through the switch pad holes, 55a and 55b, and down through the two ¼ inch diameter holes in the middle floor. Then the two nuts, 63a and 63b, FIG. 2, are threaded unto the two ends of the two switch pad bolts that extend on through the middle floor, and the two nuts are tightned up against the bottom side of the middle floor, thereby securing the switch pad with its attached electrical switch in place on the top side of the middle floor. See FIG. 2 and FIG. 3.

A ¼ inch diameter hole is drilled through the middle floor and adjacent to one side of the electric motor. This ¼ inch diameter hole is called the electrical lead hole in middle floor, 65, FIG. 2. One end of the electical lead, 20, FIG. 1 and FIG. 3, is ran up through the electrical lead hole in middle floor, 65, FIG. 2, from the bottom side of the middle floor, see FIG. 1 and FIG. 3. A clamp, 21, FIG. 3, is fastened around the electrical lead, 20, and immediately above the electrical lead hole in middle floor, 65, FIG. 2. A 1¼ inch inner diameter length of plastic pipe is cut in half lengthwise and then one of the resulting halves of pipe, which is called the electric conduit, 42, FIG. 1 and FIG. 3 is welded to the underside of the middle floor, extending from the electrical lead hole in middle floor, 65, FIG. 2, over to the rim of the middle floor, so as to enclose the electrical lead on the bottom side of the middle floor.

The four middle floor tie downs, 44a, 44b, 44c, and 44d, FIG. 1, are each a 1 inch by 1 inch piece of ¼ inch thick plastic. Each middle floor tie down is bended to fit the curve of the rim of the middle floor, 46, and then each middle floor tie down is welded equal distances apart along the rim and on the bottom side of the middle floor, so that they extend down from the middle floor, as shown in FIG. 1.

The hollow inner drum, 62, FIG. 1 and FIG. 3, is a 5⅜ inch length of plastic pipe having a wall thickness of 3/16 inch and an inner diameter of 7 inches. The upper rim of the hollow inner drum has two notches in it called the inner drum notches, 71a and 71b, FIG. 1 and FIG. 3. The two inner drum notches are directly across from each other and an imaginary diameter line across the top of the hollow inner drum connects the centers of the two inner drum notches. A slat, 68, of FIG. 1 and FIG. 3 consists of a ¼ inch thick piece of plastic that is 5⅜ inches high and 2 13/16 inches wide. Protruding out horizontally from the bottom end of the slat and continuous with the slat is the slat tab, 66, of FIG. 1 and FIG. 3. The slat tab protrudes out from the slat ¾ inch and the slat tab is 15/16 inches high. The slat with its projection, the slat tab, forms an "L" shaped piece of plastic. The slat, 68, is welded along its length and perpendicular to the outside wall of the hollow inner drum, 62, and with the slat tab, 66, extending through a slot in the bottom rim of the hollow inner drum and on into the interior of the hollow inner drum. Twelve such slats are welded in this manner around the outside wall of the hollow inner drum, with an equal distance ocurring between each slat, and with the bottom edge of each slat and each slat tab being flush with the bottom rim of the hollow inner drum. The space between each slat forms an opening called a compartment, 75, FIG. 1.

The slat band, 64, FIG 1, is 1 inch wide, 1/16 inch thick, piece of plastic that is long enough to wrap around all of the slats. The slat band is welded to each slat such that the bottom of the slat band is even with the bottom of each slat and the slat band extends upward 1 inch on each slat. See FIG. 1.

The pivot bar, 72, FIG. 1 and FIG. 3, is a piece of plastic that is 3/16 inch thick, 1 inch wide, and 7⅜ inches long. The pivot bar has a hole at its center and the diameter of this hole is the same as the diameter of the drive shaft, 60, FIG. 1 and FIG. 3. Each end of the pivot bar is placed in one of the notches, 71a and 71b, of the hollow inner drum, 62, and welded to the rim of the hollow inner drum in each notch, such that the hole in the center of the pivot bar is at the center of the interior of the hollow inner drum. See FIG. 1 and FIG. 3.

Two spacers, 74a and 74b, FIG. 1 and FIG. 3., are welded on top of the pivot bar, 72, such that each spacer is positioned approximately midway between the hole in the center of the pivot bar and the interior wall of the hollow inner drum. Each spacer is a 1 inch square piece of ¼ inch thick plastic. Then a ¼ inch hole is drilled down through the center of each spacer and on down through the pivot bar.

Two drive tabs, 70a and 70b, FIG. 1 and FIG. 3, are welded unto the interior wall of the hollow inner drum, 62, such that the distance between the two drive tabs is about 1/16 inch greater than the diameter of the drive arm, 52, FIG. 1 and FIG. 3. The top edge of each drive tab is about 1 inch below the top rim of the hollow inner drum. Each drive tab is a 1 inch by ¾ inch piece of ¼ inch thick plastic.

The magazine, 67, FIG. 1, is of the carousel type and is comprised of the inner drum, 62, slats, 68, slat tabs, 66, slat band, 64, pivot bar, 72, spacers, 74a and 74b, and drive tabs, 70a and 70b.

The slot wheel, 76, FIG. 1, is a circular piece of plastic having a diameter of 6⅞ inches and a thickness of ¼ inch. The slot wheel has 12 slots around its circumference. Each slot, 78, FIG. 1, is a ¼ inch wide notch that radiates ¾ inch inward from the rim of the slot wheel toward the center of the slot wheel. The slot wheel also has two ¼ inch holes in it, and these two holes are on a diameter line of the slot wheel and each hole is the same distance from the center of the slot wheel as is each hole in the spacers, 74a and 74b, of FIG. 1, from the center of the hollow inner drum, 62.

The slot wheel pegs, 80a and 80b, FIG. 1, are two ¼ diameter plastic bolts and each bolt is ¾ inch long.

The number wheel, 82, FIG. 1, is ¼ inch thick circular piece of plastic, having a diameter of 7⅜ inches. The number wheel has a 1¾ inch diameter hole at its center and a ¼ inch wide strip of plastic called the grab bar, 84, FIG. 1, bridges this hole. The numerical digits zero through eleven are printed an even distance apart around the circumference of the top side of the number wheel. Each digit is made approximately ½ inch high and ¼ inch wide. The two number wheel tabs, 86a and 86b, FIG. 1, are each a piece of plastic ¼ inch thick, ¾ inch long, and ¼ inch wide. Each number wheel tab is positioned directly opposite each other on the bottom side of the number wheel with the ¼ inch width of each number wheel tab welded along an imaginary diameter line on the number wheel and with the ¾ inch length of each number wheel tab hanging vertically down from the underside of the number wheel. Each number wheel tab is welded to the bottom side of the number wheel so that each number wheel tab is ¼ inch in from the rim of the number wheel and hanging down directly below one of the digits that are printed on the top side of the number wheel.

The lid, 89, FIG. 1, FIG. 5, and FIG. 6 is a 3/16 inch thickness circular piece of plastic, having a diameter of 14 inches. The lid has a section of transparent plexiglass in it called the window, 94, FIG. 1, FIG. 5, and FIG. 6. The windows top curved edge, which is closest to and runs parallel to the lid's circumference, is 1⅞ inches long and its bottom curved edge, which also runs parallel to the lids circumference, is 1¼ inches long. The distance between the top edge and bottom edge of the window is 1 inch. The window is positioned in the lid such that the top edge of the window is 3 11/16 inches from the center point of the lid. The lid band, 88, FIG. 1 and FIG. 5 and FIG. 6, is a ⅛ inch thick piece of plastic that is about 43¼ inches long and is 1¼ inches wide. The lid band has an 'L' shaped notch located near its center, called the lid band's front notch, 95, FIG. 5. The lid band is wrapped around the rim of the lid, 89, and welded to the lid so that the top of the lid band is flush with the top of the lid. The lid band's length is such that there will be a ⅛ inch gap between the two ends of the lid band, after the lid band has been welded to the lid, see FIG. 6. The lid band is welded to the rim of the lid such that an imaginary diameter line running across the top of the lid and through the center of the window will have one of its ends in line with the middle of the gap between the two ends of the lid band and its other end in line with the end of the horizontal part of the 'L' shaped lid band's notch, 95, in the lid band.

The hinge rod, 92, FIG. 1 and FIG. 6, is a 1 inch length of ¼ diameter plastic rod. The hinge rod is welded to the bottom edge of each end of the lid band, 88, so that the hinge rod bridges the gap across the two ends of the lid band, see FIG. 6. The latch, 90, FIG. 1 and FIG. 6, is a 3/16 inch thickness piece of plastic and it consists of a larger rectangular section that is 6¼ inches long and 1⅛ inches wide and a smaller rectangular section that is about 1⅛ inches long and about ⅛ inch wide and this smaller section is continuous with the larger section and is like a "neck" portion of the latch. The larger rectangular section of the latch has two slots in it. Each slot is about 3/16 inch wide and 1 inch long and the two slots are about 1 inch apart and on a line that divides the latch in half length-wise. The latch is heated until it is pliable and then the smaller rectangular section of the latch, which is like a "neck" of the latch, is wrapped around the hinge rod, 92, so that the latch hangs down from the hinge rod and can swing on the hinge rod. See FIG. 6.

The drawer front, 32, FIG. 1, consists of the semicircle section of the wall of the case that was cut out of the case to form the drawer entry, 24. The drawer front has a height of 5¾ inches. The drawer floor, 28, FIG. 1, is one of the halves formed by cutting a 3/16 inch thick circular piece of plastic, having a diameter of 13¼ inches, in half. The curved edge of the drawer floor is then welded to the inside wall of the drawer front such that the bottom side of the drawer floor is suspended 3/16 inches up from the bottom edge of the drawer front, see FIG. 1. The back of drawer, 34, FIG. 1, is a ⅛ inch thick piece of plastic that is 13¼ inches long and 5¼ inches wide. The back of drawer is welded to the drawer floor, 28, and to the inside wall of the drawer front so that its bottom edge is flush with the bottom side of the drawer floor and it extends up perpendicular from the drawer floor, see FIG. 1. The drawer handle, 30, FIG. 1 and FIG. 6, is a 4¼ inch length of ¼ inch diameter plastic rod that has been heated and then formed into the shape of a handle as shown in FIG. 6.

The drawer handle is positioned in the center of the outside wall of the drawer front and then welded to the drawer front. The drawer molding, 31, FIG. 1, FIG. 5, and FIG. 6, is a 1⅜ inch wide band of ⅛ inch thick plastic that is welded onto the outside of the drawer front such that ⅜ inch of the drawer molding's width extends beyond the whole top edge of the drawer front and ⅜ inch of the drawer molding's width also extends beyond the whole 5¾ inch length of each of two ends of the drawer front. The drawer front, 32, drawer floor, 28, back of drawer 34, drawer molding, 31, and drawer handle, 30, alltogether comprise the drawer, 33.

OPERATION OF INVENTION

The case, 10, FIG. 1, is a hollow plastic pipe that holds and encloses the other parts of the machine.

The hand entry, 14, FIG. 1 and FIG. 5, is an opening on the front side of the case that allows the student to reach into the case and retrieve a reward that has dropped down onto the bottom floor, 22, of the case.

The drawer entry, 24, FIG. 1, is a semicircle opening on the back side of the case that provides a place for the drawer, 33, to reside.

The hand shield, 12, FIG. 1, helps to prevent the student from reaching their hand up through the middle floor opening, 58, whereby they could possibly use their hand to rotate the magazine, 67, by pushing on one of the slats, 68, that are on either side of the middle floor opening.

The three middle floor supports, 40a, 40b, 40c, FIG. 1 serve as a base for the middle floor, 46, to rest on.

The middle floor, 46, FIG. 1 and FIG. 3 serves as a resting place for the electric motor, 48, and electrical switch, 56. The middle floor also serves as a resting place for the magazine, 67, and for the rewards that a teacher puts into the compartments, 75, of the magazine.

The middle floor, 46, is lowered down into the case and allowed to come to rest on the three middle floor supports, 40a, 40b, and 40c. The middle floor is positioned on the three middle floor supports so that the middle floor opening, 58, FIG. 1 and FIG. 3, has its center an equal distance from both ends of the hand entry, 14, FIG. 5. The middle floor opening, 58, of the middle floor is where the rewards that are stored in the compartments, 75, FIG. 1, drop down through, as a result of the hollow inner drum rotating on the middle floor and bringing the compartments over the middle floor opening.

The four middle floor tie downs, 44a, 44b, 44c, 44d, FIG. 1, hang down from near the rim and on the bottom side of the middle floor and they serve the purpose of securing the middle floor, 46, in place, after the middle floor has once come to rest on the three middle floor supports, 40a, 40b, 40c. This is accomplished by drilling a hole through each middle floor tie down, from the inside of the case, and on through the wall of the case, 10, to the outside of the case. Then a tie down bolt, 26, FIG. 1, is inserted from the outside of the case through the wall of the case and on through the corresponding hole in the middle floor tie down. A nut is then placed on the tie down bolt, from the inside of the case, and the nut is turned on the tie down bolt until the middle floor tie down is pulled up tightly against the inside wall of the case.

After the middle floor, 46, with its attached electric motor, 48, and electrical switch, 56, has been secured in place, on top of the three middle floor supports, the magazine, 67, is lowered down into the case and onto the middle floor, with the drive shaft, 60, FIG. 3, of the electric motor extending up through the hole in the center of the pivot bar and about ⅛ inch above the top side of the pivot bar, and with the hollow inner drum, 62, enclosing the electric motor, 48, electrical switch, 56, and electrical valve, 50, and with the slats, 68, slat tabs, 66, and the bottom rim of the hollow inner drum, 62, all three resting on the middle floor, and with the drive arm, 52, of the electric motor residing between the two drive tabs, 70a and 70b. See FIG. 1 and FIG. 3.

Refer to FIG. 2, unless otherwise instructed, for the discussion in this paragraph explaining how the electrical switch, 56, is made adjustable.: The electrical switch has already been glued to the switch pad, 57, and the switch pad is resting on the middle floor, 46, such that the two switch pad holes, 55a and 55b, are over the two holes in the middle floor called the middle floor switch pad holes, 47a and 47b. The two switch pad bolts, 59a and 59b, run down through the two switch pad holes, 55a and 55b, and down through the two middle floor switch pad holes, 47a and 47b. The nuts, 63a and 63b, are threaded on the end of the two switch pad bolts that extend on down from the bottom side of the middle floor. The two switch pad washers, 61a and 61b, are between the head of the switch pad bolts and the switch pad and their diameter is large enough to span the switch pad holes and make contact with the switch pad. The two nuts are not threaded on tightly yet and thus the relatively large switch pad holes, 55a and 55b, that surround the stems of the more narrow switch pad bolts, 59a and 59b, allows one to move the switch pad and electrical switch into various positions around the two switch pad bolts, before the nuts, 63a and 63b, are turned on to the two switch pad bolts, 59a and 59b, tightly. See FIG. 1, FIG. 2 and FIG. 3.

Refer to FIG. 3, unless otherwise directed, for the discussion in this paragraph as to how to adjust the position of the electrical switch for correct operation of the machine. With the drive arm, 52, and hollow inner drum, 62, rotated so that one of the slats, 68, is over the center of the middle floor opening, 58, the electrical switch, 56, is positioned so that the switch arm, 54, is up against the end of the slat tab, 66, so that the slat tab is pushing the switch arm far enough in the direction of the electric motor, 48, to cause the electrical switch, 56, to close, and thus allow current to reach the electric motor through the electrical switch. And also the position of the electrical switch has to be such that as the drive arm, 52, and hollow inner drum, 62, continue to rotate clockwise, the slat tab, 66, will go beyond the end of the switch arm, 54, just when its corresponding slat, 68, reaches the edge of the middle floor opening, 58, and thus the switch arm, 54, will be allowed to spring back, in the direction of the middle floor opening, 58, to its normal resting position, which will cause the electrical switch, 56, to open, and thus cause the electric motor, 48, to shut off and the hollow inner drum to cease rotating. When the electric motor shuts off this way, there should be one slat on each edge of the middle floor opening and the compartment, 75, FIG. 1, that is between the two slats, should be directly over the middle floor opening, and the reward that the teacher had placed in the compartment should have dropped on down through the middle floor opening to the bottom floor, 22, FIG. 1, beneath. When the electrical switch has been so positioned, the two nuts, 63a and 63b, are threaded onto the two switch pad bolts, 59a and 59b, very tightly in order to draw the switch pad, 57, tightly against the top side of the middle floor, 46, so that the friction between the switch pad and middle floor will keep the switch pad, with its attached electrical switch, in place, see FIG. 2.

The twelve slats, 68, FIG. 1 and FIG. 3, that extend out from the hollow inner drum form a space between each pair of slats called a compartment, 75, FIG. 1. The compartments enclose the rewards that the teacher puts in the machine and when the magazine, 67, rotates, the slats push against the rewards and cause the rewards to slide along on the middle floor until they reach the middle floor opening, 58, FIG. 1 and FIG. 3, where they drop down to the bottom floor, 22, for retrieval via the hand entry, 14, FIG. 1 and FIG. 5. containing smaller rewards within each compartment, 75, so that smaller rewards don't become lodged between the slats, 68, and the inner wall of the case, 10, as the magazine, 67, rotates.

The slat tabs, 66, FIG. 1 and FIG. 3, extend into the interior of the hollow inner drum, 62, and act as cams for the switch arm, 54, FIG. 1 and FIG. 3. As the hollow inner drum rotates, the slat tabs engage the switch arm, 54, and move the switch arm to close the electrical switch, 56, and thus causing the electric motor, 48, FIG. 1 and FIG. 3, to continue receiving current through the electrical switch. Then when the slat tab rotates beyond the end of the switch arm, the switch arm is allowed to return to its normal position and the electrical switch is opened, causing the electric motor to shut off.

The two spacers, 74a and 74b, FIG. 1 and FIG. 3, serve as a resting place for the slot wheel, 76, FIG. 1 and they also serve to elevate the slot wheel above the drive shaft, 60, FIG. 1 and FIG. 3, far enough so that the slot wheel will not be resting on the top of the drive shaft, 60, that extends above the pivot bar. See FIG. 3.

The drive shaft, 60, FIG. 1 and FIG. 3, is part of the electric motor, 48, FIG. 1 and FIG. 3, and the drive shaft turns clockwise, when the electric motor is running. Since the drive arm, 52, is connected to the drive shaft, 60, the drive arm rotates clockwise, when the electric motor is running. And since the drive arm extends out at right angles from the drive shaft far enough so that the end of the drive arm is between the two drive tabs, 70a and 70b, when the drive arm rotates it pushes against a drive tab. And since the drive tab is welded to the hollow inner drum, the hollow inner drum rotates, when the electric motor runs. See FIG. 3. A drive tab on either side of the drive arm helps prevent the hollow inner drum from rotating either clockwise or counter clockwise, when the electric motor is not running, since it takes a relatively large force to move the drive arm, because the electric motor is geared so low (a one revolution per minute gear reduction electric motor). The pivot bar, 72, FIG. 1 and FIG. 3, which has its ends welded to the hollow inner drum, serves to make the hollow inner drum, 62, rotate around the drive shaft, 60, of the electric motor, when the drive arm, 52, pushes against the drive tab, 70a, because the hole in the center of the pivot bar fits over the drive shaft. The two inner drum notches, 71a and 71b, FIG. 1, allows the pivot bar to be lowered enough so that the hole in the pivot bar reaches down over the relatively short drive shaft, 60. See FIG. 1 and FIG. 3.

The slot wheel, 76, FIG. 1, is placed inside of the hollow inner drum, 62, and on top of the the two spacers, 74a and 74b, FIG. 1 and FIG. 3. The slot wheel is positioned on top of the the two spacers so that the slot wheel is centered inside of the hollow inner drum and so that when the hollow inner drum has been rotated to a position such that there is a slat, 68, on each edge of the middle floor opening, 58, a line extending outward from a slot, 78, would pass over the center of the middle floor opening. Then with the slot wheel, 76, in this position, a ⅛ inch hole is drilled from the top side of the slot wheel and down through each spacer and through the pivot bar, 72, FIG. 1 and FIG. 3. Then a ⅛ inch plastic bolt called a slot wheel peg, 80a and 80b, FIG. 1., is pushed down through the slot wheel, each spacer, and the pivot bar. The purpose of the slot wheel pegs is to secure the slot wheel to the spacers and and indirectly to the pivot bar so that when the hollow inner drum and pivot bar rotate, the slot wheel will rotate with them. The purpose of the slot wheel is to provide 12 slots, 78, FIG. 1, on its circuference and the job of each slot, 78, is to hold a number wheel tab, 86a and 86b, FIG. 1.

The function of the number wheel, 82, FIG. 1, is to allow a teacher to look through the window, 94, of the lid, 89, FIG. 1, FIG. 5, and FIG. 6, and be informed as to how many compartments, 75, FIG. 1, still contain a reward, without the teacher having to remove the lid to make this determination. The number wheel accomplishes this task as follows: When it comes time for the teacher to put rewards in the compartments, the hollow inner drum should be in such position that one slat, 68, is on each edge of the middle floor opening, 58, and thus one of the compartments, 75, is directly over the middle floor opening, as it normally should be each time after a reward is dropped out and the magazine, 67, has stoped rotating. Therefore, one of the slots, 78, of the slot wheel, 76, will also be lined up with the center of the middle floor opening, as explained above. Now, assuming that the machine is empty of rewards but that the teacher has just five rewards to put in it, instead of the eleven that it could hold with its eleven compartments, the teacher will place one reward in each consecutive compartment counter clockwise from the middle floor opening. After having put the rewards in these five compartments, the teacher will, by holding onto the grab bar, 84, FIG. 1, with two fingers, lower the number wheel so that the two number wheel tabs, 86a and 86b, extend down into a pair of slots, 78, of the slot wheel, 76, such that the digit '5', that has been painted on top of the number wheel, will be in such a position that this digit '5' will bisect a vertical plane running directly up from the center of the middle floor opening. The number wheel will be resting on the top rim of the hollow inner drum, 62, FIG. 1., but the two number wheel tabs, 86a and 86b, will extend down from the number wheel into the interior of the hollow inner drum and into a pair of slots in the slot wheel. In this position of the number wheel, when the lid, 89, is replaced, the teacher will be able to look down from the top of the lid through the window, 94, and see the digit '5' directly below the window. Then, later, when the hollow inner drum again rotates clockwise one compartment (1/12 of a revolution) and drops out a reward, the slot wheel will also rotate 1/12 of a revolution, and since the number wheel tabs, 86a and 86b, are extended down into a pair of slots in the slot wheel, the number wheel will also be forced to make 1/12 of a clockwise revolution and this will cause the digit '4' to come into view under the window, 94, of the lid, and the teacher will be able to look through the window and see the digit '4', signifying that there are now only four rewards left in the machine. Of course, after the remaining four compartments with rewards have dropped their rewards through the middle floor opening, the digit '0' will appear below the window and the teacher will know that the machine is empty of rewards and must be filled, before a student is allowed to use it again.

The drawer front, 32, drawer floor, 28, and back of drawer, 34, FIG. 1, together provide a place for the teacher to store the rewards that will later be put in the compartments, 75, FIG. 1, of the machine. The drawer floor, 28, is elevated 3/16 of an inch above the bottom of the drawer front, 32, so that when the drawer front is slide along the same surface that the case, 10, is setting on and pushed into the opening in the case called the drawer entry, 24, FIG. 1, the drawer floor will slide over top of the bottom floor, 22. The bottom floor will hold the drawer up, whenever the case is lifted up. The back of drawer, 34, not only helps hold the rewards in, but since it reaches up almost to the bottom side of the middle floor, 46, when the drawer is residing in the drawer entry, 24, it makes it almost impossible for students to get at the rewards stored in the drawer by reaching into the case via the hand entry, 14. The drawer molding, 31, FIG. 1 and FIG. 6, serve the purpose of covering up the small gap that occurs between the edges of the drawer entry, 24, and the drawer front, 32, when the drawer is slid into the drawer entry. The drawer handle, 30, provides a place for one to grasp and move the drawer.

The lid, 89, lid band, 88, hinge rod, 92, latch, 90, lid pin, 96, latch support, 38, and latch stay, 36, FIG. 1. FIG. 5, and FIG. 6, work together to hold the magazine, 67, slot wheel, 76, number wheel, 82, and rewards inside of the case in the event that the case is turned upside down, and they also work together to prevent students from stealing the rewards that are in the machine, as described in the following of this paragraph.: The lid, 89, is lowered down on top of the case, 10, such that the lid pin, 96, FIG. 1 and FIG. 5, is in the vertical portion of the lid band's front notch, 95, FIG. 5. Then the teacher grasps the latch, 90, FIG. 1 and FIG. 6, and twists the lid counter clockwise until the end of the horizontal part of the lid band's front notch comes to rest against the lid pin. The hinge rod, 92, FIG. 1 and FIG. 6, then allows the two slots in the latch, 90, to be swung down over the latch support, 38, and the latch stay, 36, with the latch coming to rest against the drawer front, 32, FIG. 6. Then a padalock is put through the hole in the latch stay, 36, to lock the latch in place against the drawer front. With the latch thus locked in place against the drawer front, the student is prevented from sliding the drawer out of the case and getting at the rewards stored in the drawer. The lid pin, 96, in the lid band's front notch, 95, prevents the front part of the lid from being pried up, and the latch support and latch stay extend through the two slots in the latch to prevent the back part of the lid from being lifted up. The latch support and latch stay, when they are extended through the two slots in the latch, also work together to prevent the lid from being rotated far enough to get the vertical part of the lid band's front notch over the lid pin, which would allow the front of the lid to be pried up.

Figure 4:
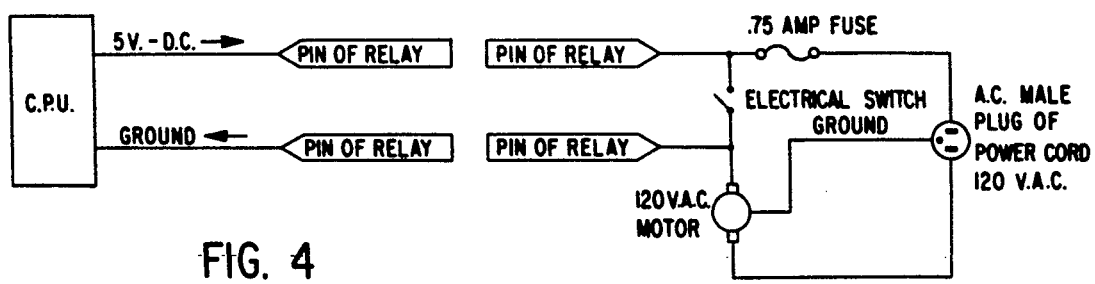
FIG. 4 is a schematic diagram of the electrical wiring system for the machine.

The following is a description of how a computer and my invention work together to deliver a reward to a student.: Refer to FIG. 1 and FIG. 3 for a diagram of the parts, unless otherwise specified. The computer cord, 16, FIG. 1, is plugged into one of the outlet ports of a computer, such as the printer port. The electric power cord, 18, FIG. 1, is plugged into a 120 volt alternating current electrical outlet. The computer cord and electric power cord together are called the electrical lead, 20. The electrical lead enters the case, 10, through the hole in case for electrical lead, 19. The electrical lead enters the electric conduit, 42, immediately after entering the inside of the case. The electric conduit encloses the electrical lead on the underside of the middle floor, 46, and thereby helps to prevent an electrical shock to the student, by making it difficult for the student to tamper with the wires, while the student has their hand through the hand entry, 14. A clamp, 21, FIG. 3, is fastened to the electrical lead just above a hole in the middle floor called the electrical lead hole in middle floor, 65, FIG. 2. This clamp, 21, helps prevent the wires of the electrical lead, 20, from being pulled away from their connections to the electric motor, 48, electrical valve, 50, and electrical switch, 56, in the event someone pulls on the electrical lead from outside of the case. The computer is programmed to give the student questions and to allow the student to enter answers to the questions into the computer via the computer's keyboard. Then, after the student has answered a certain number of questions correctly, said number being specified by the computer program, the program causes the computer to send a low voltage and low amperage signal to the electrical valve, 50, via the computer cord, 16, FIG. 1. This low voltage signal from the computer triggers the electrical valve to open and allow a much larger current to flow through the electrical valve to the electric motor, 48, via the electric power cord, 18, FIG. 1. Therefore, the electric motor, 48, starts up and the drive arm, 52, rotates against the drive tab, 70a, causing the hollow inner drum, 62, the slats, 68, and the slat tabs, 66, to rotate clockwise. Therefore, the reward that a teacher has placed in a compartment, 75, between a pair of slats, is slid along on top of the middle floor, 46, toward the middle floor opening, 58. After about 1/24 of a revolution of the hollow inner drum, the computer is programed, by means of a timed loop, to send another signal to the electrical valve, thus causing the electrical valve to close, and thus shutting off the current that had been reaching the electric motor through the electrical valve. But by the time the hollow inner drum has made 1/24 of a revolution and before the electrical valve has been closed, a slat tab, 66, has already rotated against the switch arm, 54, and has pushed the switch arm in the direction of the electric motor far enough to close the electrical switch, 56. Since the electric power cord can bring electricity to the electric motor either through the open electrical valve, 50, or through the closed electrical switch, 56, because the electrical valve and electrical switch are wired in parallel to the electric motor and the electric power cord, the electric motor continues to run (see FIG. 4 for a schematic diagram of the wiring). However, by the time the electric motor has caused the hollow inner drum to make about 1/12 of a revolution, the slat tab, 66, that was pushing in on the switch arm, 54, to keep the electrical switch closed, moves past the end of the switch arm and, therefore, the switch arm springs back toward the middle floor opening, 58, causing the electrical switch to open again and, therefore, electricity is no longer able to reach the electric motor through either the electrical valve or the electrical switch. Therefore, the electric motor stops and the hollow inner drum stops turning. But by the time the hollow inner drum has stopped turning, the hollow inner drum has been rotated far enough, 1/12 revolution, to move one of the twelve compartments, 75, over the middle floor opening, 58, and the reward that the compartment contained drops down through the middle floor opening to the bottom floor, 22, below, where the student can retrieve it via the hand entry, 14.

SUMMARY OF THE INVENTION

This machine is ideally suited for use as an educational tool. It is an educational tool because students can be required to figure out the correct answers to questions in order to be allowed the fun of interacting with this machine. Students are motivated to use the machine because of the exitement they have anticipating what reward it might drop out for them. And the fact that the student also gets to interact with a computer in the process of trying to make the machine drop a reward, provides another motivation for them to use the machine.

The machine also has the following special design features that help to enhance its value for use in the classroom or home.

a drawer in the machine provides a convenient place to store rewards for easy access, when more are needed to fill the machine for student use, only one padalock is required to secure both the rewards stored in the compartments and the rewards stored in the drawer from student theft, the machine will notify the teacher as to how many compartments have rewards in them so that the teacher can decide whether or not to refill the machine, the individual compartments are large enough to hold a very large variety of rewards, an easily removable lid makes it easy to refill the machine's compartments with rewards, the machine's flat top saves desktop space by allowing other objects to be sit on top of the machine, plastic construction and enclosed wires reduce the hazard of electrical shocks.

While my above description contains many specificities, these should not be construed as limitations on the scope of the invention, but rather as an exemplification of one preferred embodiment thereof. Many other variations are possible. For example, the machine could be made smaller to save desktop space, or it could be made larger to allow an even greater variety of rewards to be placed in it. Although P.V.C. plastic is the prefered material for most of the construction of my machine, other materials could be used. Although other methods, such as by incorporating a photoelectric cell and or using electronic switches, could be used to stop the electric motor at just the right time, I believe that my design, whereby a mechanical switch is turned on and off by the cam action of the moving compartments themselves, provides a very simple, relatively inexpensive, and reliable method of turning the electric motor on and off at the right times to ensure alignment of the compartments over the reward dispensing opening. Although mechanical counting devices and or electronic and digital read out devices could be used to notify the teacher as to how many rewards are still left in the compartments, I believe that my design, whereby an adjustable number wheel and a window in the lid is used, provides a very simple, relatively inexpensive, and effective design for this purpose.

I claim:

1. A computer activated reward dispensing machine comprising a carousel-type magazine having a hollow inner drum at its center, a plurality of slats radiating out from the outer wall of said inner drum thus forming a plurality of compartments spaced axially around said inner drum, said magazine resting on a middle floor, a case enclosing said floor and said magazine, said middle floor formed with an opening, an electric motor secured to said floor inside of said inner drum, gear reduction type coupling means driven by said motor adapted to move said compartments toward said opening, said motor including a drive shaft extending upward substantially perpendicularly to the center of said floor, a pivot bar extending across said drum remote from said floor, said shaft also extending through said pivot bar, a drive arm extending at a right angle from said shaft toward the inner wall of said drum, a drive tab extending radially inward from said inner wall in position to be engaged by said drive arm, whereby said drum will be driven by the rotation of said motor, thereby causing said compartments to be rotated over said opening in said floor, an electric valve in series with said motor and in series with a source of electric power, said valve thus being effective to allow or prohibit the flow of power to said motor, said valve being responsive to signals from a computer programmed to send such a signal to said valve, an electric switch in series between said motor and said source of power but in parallel with said electric valve, and alignment means connected to said switch adapted to sense alignment between said compartment and said opening in said floor and to control the power flow from said source through said switch to operate said motor until such alignment is reached and to stop operation of said motor at that time.

2. The reward dispensing machine of claim 1 wherein alignment means includes said electrical switch being closed and opened by the back and forth movement of a switch arm that extends out from said electrical switch, and a slat tab that extends from each said slat on through the wall of said hollow inner drum and into the interior of said hollow inner drum, and with said electrical switch secured to said middle floor inside of said hollow inner drum in such position that the rotation of said magazine causes said slat tab to contact and push against said switch arm to close said electrical switch until said slat tab has continued rotating far enough so that said slat tab moves away from said switch arm at the same time that said compartment is aligned over said middle floor opening in said middle floor, whereby said electric motor is caused to stop running and said magazine to stop rotating.

3. The invention of claim 1 including a lid that rests on top of said case and is removable from said case, and a window in one area of said lid, and a number wheel with a plurality of numerical digits, with said numerical digits ranging consecutively from 0 through one less than the number of said compartments contained in said magazine, painted equal distances apart around the circumference of said number wheel, and with a means for selectively positioning and temporarily securing said number wheel to the top of stationary said magazine so that one of said numerical digits representing the number of said compartments still holding a tangible reward will appear under said window, and so that when said magazine again rotates to bring a reward bearing said compartment in alignment over said middle floor opening, said number wheel will also rotate to bring one of said numerical digits under said window, which has a value of one less than that one of said numerical digits that was previously under said window.

4. The reward dispensing machine of claim 1 including a drawer that can be slid in and out of a drawer entry in said case, a lid that is removable from the top of said case, a latch that is free to swing and hangs down from the circumference of said lid, and a means for having said latch secure both said lid to said case and said drawer to the inside of said drawer entry with just one padalock.

* * * * *